(12) United States Patent
Chiang et al.

(10) Patent No.: US 8,448,540 B2
(45) Date of Patent: May 28, 2013

(54) ASSEMBLING MECHANISM OF A SELF-LOCKING LINEAR ACTUATOR

(75) Inventors: Hsin-An Chiang, Taichung (TW); Tung-Hsin Chen, Taichung (TW); Tai-Hung Lin, Taichung (TW); Shih-Yuan Tseng, Taichung (TW); Kuo-En Tseng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 727 days.

(21) Appl. No.: 12/631,971

(22) Filed: Dec. 7, 2009

(65) Prior Publication Data

US 2011/0132139 A1    Jun. 9, 2011

(51) Int. Cl.
   *F16H 25/20*     (2006.01)
   *F16H 57/02*     (2012.01)
(52) U.S. Cl.
   USPC ........... 74/606 R; 74/89; 74/89.23; 74/89.35; 74/89.37; 310/20; D15/143
(58) Field of Classification Search
   USPC   74/606 R, 89.35, 89.37, 89, 89.23; D15/143; 310/20
   See application file for complete search history.

(56) References Cited

U.S. PATENT DOCUMENTS

| | | | |
|---|---|---|---|
| 6,259,175 B1 * | 7/2001 | Alfano et al. | 310/20 |
| 6,321,611 B1 * | 11/2001 | Szu et al. | 74/89.37 |
| 7,066,041 B2 * | 6/2006 | Nielsen | 74/89.35 |
| 7,471,020 B2 * | 12/2008 | Abrahamsen | 310/20 |
| D595,753 S * | 7/2009 | Tseng | D15/143 |
| 8,109,164 B2 * | 2/2012 | Tseng et al. | 74/89.37 |
| 2007/0169578 A1 * | 7/2007 | Christensen et al. | 74/89.37 |
| 2008/0264201 A1 * | 10/2008 | Bhatti | 74/606 R |
| 2012/0222509 A1 * | 9/2012 | Winther et al. | 74/89 |
| 2012/0222510 A1 * | 9/2012 | Winther et al. | 74/89.23 |

* cited by examiner

*Primary Examiner* — Vinh Luong
(74) *Attorney, Agent, or Firm* — Guice Patents PLLC

(57) ABSTRACT

An assembling mechanism of a self-locking linear actuator includes a gearbox, a one-piece rear retainer seat and a casing. The gearbox is composed of two half pieces, which are mated with each other for accommodating and locating a transmission mechanism of the actuator. The rear retainer seat is fixedly held in the gearbox for supporting a bearing of a threaded rod of the transmission mechanism and bearing the stress from the threaded rod. The contact faces of the rear retainer seat and the gearbox are regular polygonal to facilitate adjustment of fixing angle of the rear retainer seat. The casing is composed of two half casings, which are mated with each other to accommodate the transmission mechanism, the gearbox and the rear retainer seat. The mating faces of the half casings are parallel to the axis of the output shaft of a motor to facilitate connection operation of the casing.

3 Claims, 7 Drawing Sheets

ASSEMBLING MECHANISM OF A SELF-LOCKING LINEAR ACTUATOR

BACKGROUND OF THE INVENTION

The present invention relates generally to a linear actuator, and more particularly to an assembling mechanism of a self-locking linear actuator.

FIG. 1 shows the transmission mechanism of a conventional linear actuator. A motor 10 outputs power to a worm 11. A worm wheel 12 is perpendicularly engaged with the worm 12 to transmit the power to a threaded rod 13 and make the threaded rod 13 rotate. At this time, a threaded bush 14 screwed on the threaded rod 13 is displaced in an axial direction of the threaded rod 13. The threaded bush 14 serves to push an inner tube 15 in coaxial abutment with the threaded bush 14. The inner tube 15 is telescopically moved to output linear push force. A self-locking spring 16 is fixed on the worm wheel 12 to control the rotation of the threaded rod 13.

FIGS. 2 and 3 show a conventional actuator assembling mechanism 20 for assembling the transmission mechanism of the linear actuator. The assembling mechanism 20 includes a tubular gearbox 21 in which the respective components of the transmission mechanism are accommodated. A rear retainer seat 22 composed of two pieces is disposed at a rear end of the threaded rod 13 for fixing a bearing 17 thereof and axially locating the threaded rod 13. The gearbox 21 and the rear retainer seat 22 are further assembled and housed in a casing composed of an upper half casing 23 and a lower half casing 24. The conventional assembling mechanism 20 is not optimal and has at least three shortcomings in structure as follows:

1. The rear retainer seat 22 also serves as a connection section for fixedly connecting the linear actuator with external components. However, the rear retainer seat 22 is composed of two pieces and has insufficient strength for bearing stress. As a result, the components are apt to damage to shorten the lifetime of the product.
2. The casing is composed of two half casings 23, 24 with the connection faces of the two half casings 23, 24 normal to the axial direction of the motor 10. This is inconvenient to the manufacturing and processing operation. In assembling, the operation space is limited. Moreover, when the two half casings are connected by means of ultrasonic fusion, due to the orientation, the two half casings 23, 24 can hardly keep tightly attaching to each other simply by means of gravity. Consequently, the connection reliability will be affected.
3. The gearbox 21 is connected to an outer tube 18 by means of an additional clamp 25. Such structure is complicated so that the manufacturing process cannot be simplified. As a result, the manufacturing cost is relatively high.

SUMMARY OF THE INVENTION

It is therefore a primary object of the present invention to provide an assembling mechanism of a self-locking linear actuator, which can enhance connection strength between the linear actuator and external components and prolong the lifetime of the linear actuator. Moreover, when the half casings of the assembling mechanism are connected by means of ultrasonic fusion, the half casings can keep tightly attaching to each other simply by means of gravity. Also, the outer tube can be connected with the gearbox without using any additional fixing members so that the number of the components of the assembling mechanism is reduced to lower cost and simplify the manufacturing process.

To achieve the above and other objects, the assembling mechanism of the self-locking linear actuator of the present invention includes: a gearbox having a substantially column-shaped box body, the box body being fixedly connected with a motor of the transmission mechanism with an axis of the box body normal to an output shaft of the motor, the box body being composed of two half pieces mated with each other, the mating faces of the two half pieces being parallel to an axial direction of the box body, a connection room axially inward extending from an end face of a first axial end of the box body, a locating room axially inward extending from an end face of a second axial end of the box body by a predetermined depth, a peripheral wall of the locating room having a regular polygonal cross-section normal to the axial direction of the box body; a rear retainer seat, which is an integrally formed one-piece component, the rear retainer seat having a seat body with a predetermined shape, a first end of the seat body being inserted in the locating room, the first end of the seat body having a locating peripheral face with regular polygonal shape for attaching to and contacting with the regular polygonal peripheral wall of the locating room, the number of the sides of the regular polygonal shape of the locating peripheral face being equal to the number of the sides of the regular polygonal peripheral wall of the locating room, an end face of the first end of the seat body being recessed to form a bearing socket for receiving therein a bearing of a threaded rod of the transmission mechanism; a casing, which is a hollow body composed of two half casings, which are mated with each other to accommodate therein the transmission mechanism, the gearbox and a part of the rear retainer seat, the mating faces of the two half casings being parallel to an axis of the output shaft of the motor; an outer tube with a predetermined length, an axial end of the outer tube being inserted in the connection room; and an insertion section including engaging bosses and engaging holes complementary to the engaging bosses, the engaging bosses and the engaging holes being respectively disposed on inner face of a wall of the connection room and the axial end of the outer tube, whereby the engaging bosses can be inserted in the engaging holes to fixedly connect the outer tube with the box body.

The present invention can be best understood through the following description and accompanying drawings, wherein:

DETAILED DESCRIPTION OF THE PREFERRED EMBODIMENTS

Figure 1:
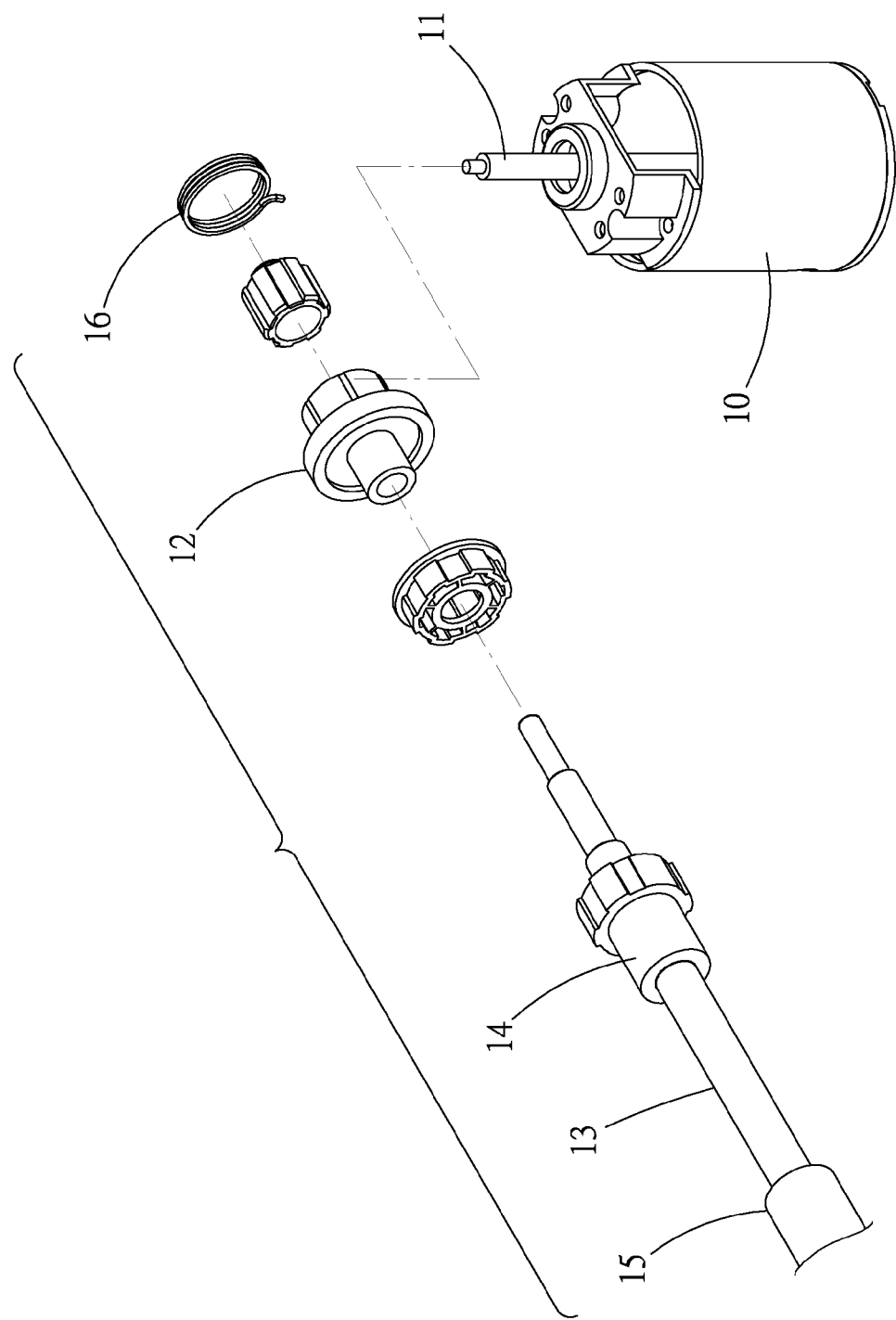
FIG. 1 is a perspective exploded view of the transmission mechanism of a conventional linear actuator.
Figure 2:
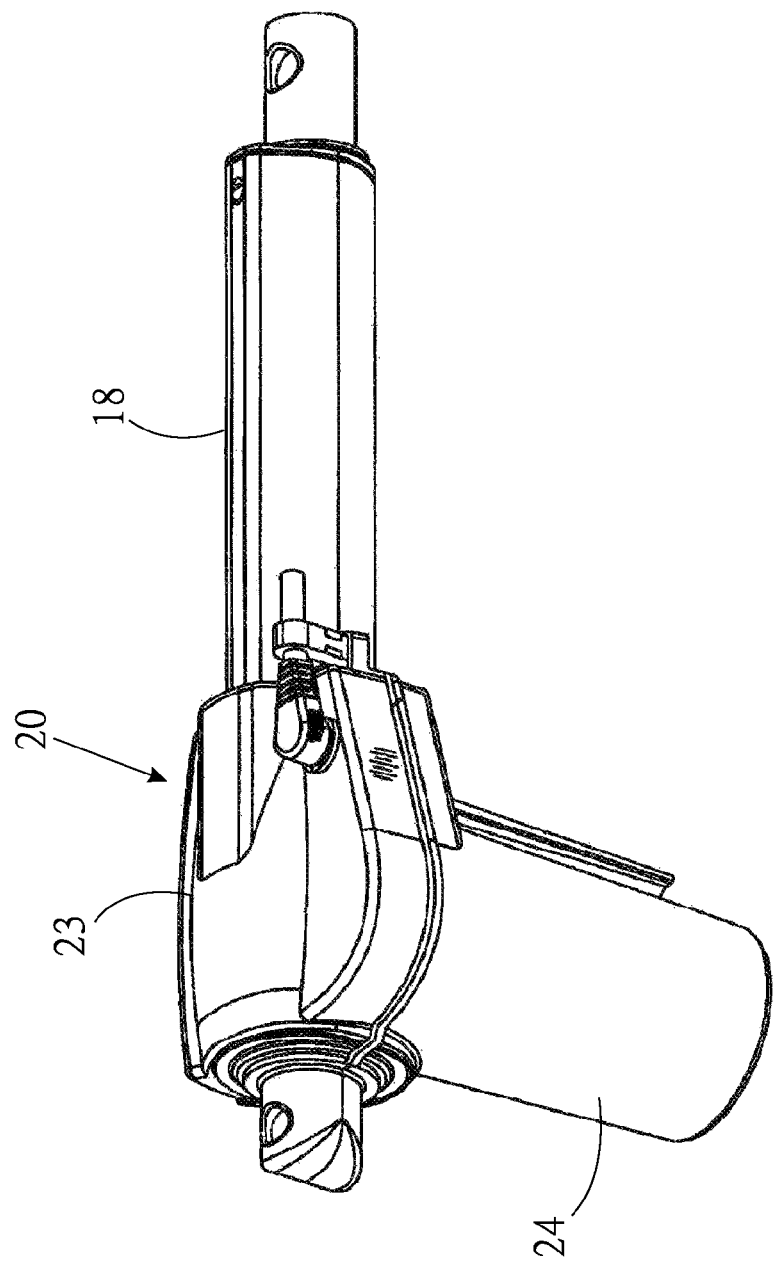
FIG. 2 is a perspective view of a conventional actuator assembling mechanism for assembling the transmission mechanism of the linear actuator.
Figure 3:
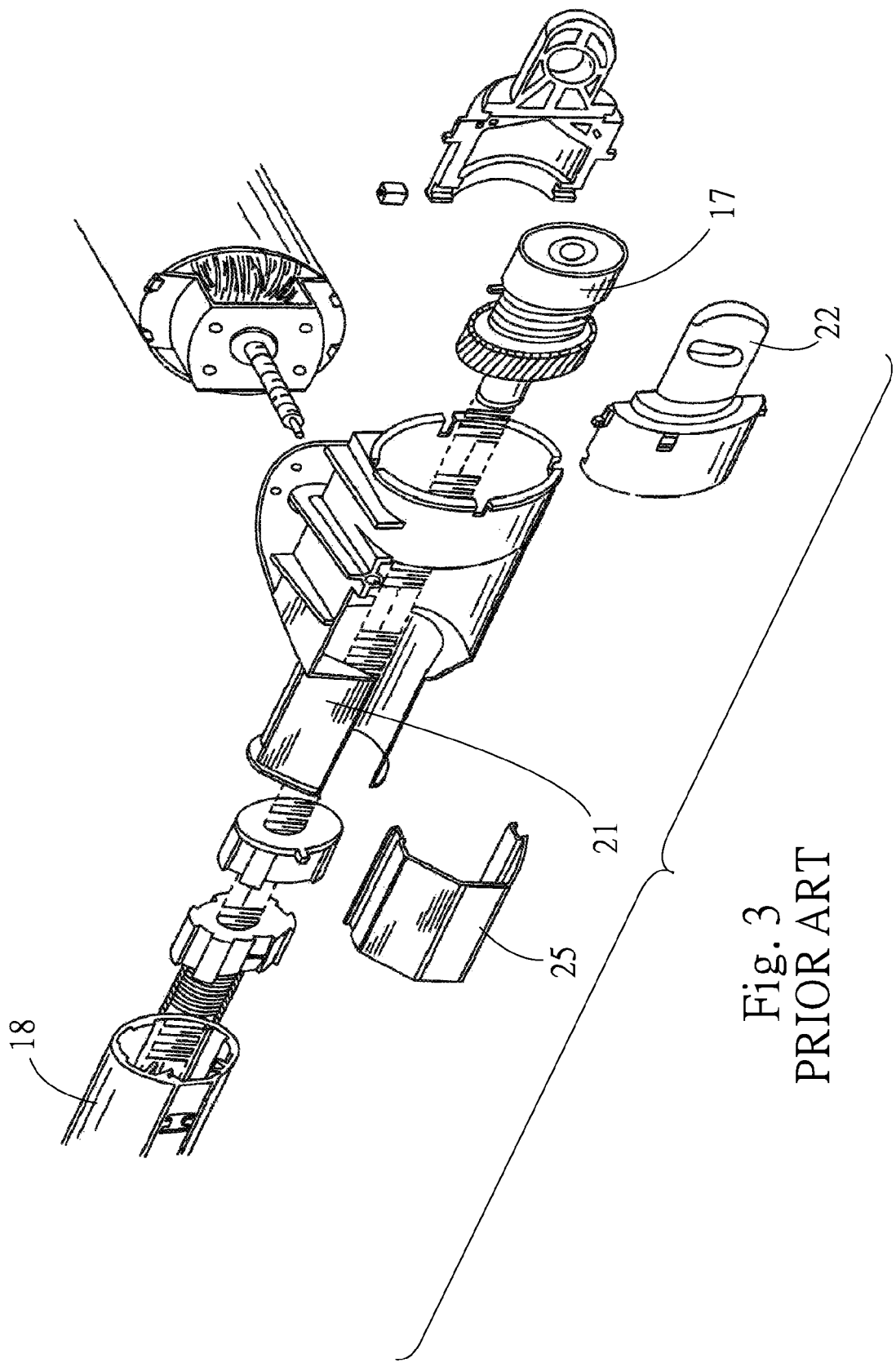
FIG. 3 is a perspective exploded view of a part of the conventional actuator assembling mechanism.
Figure 4:
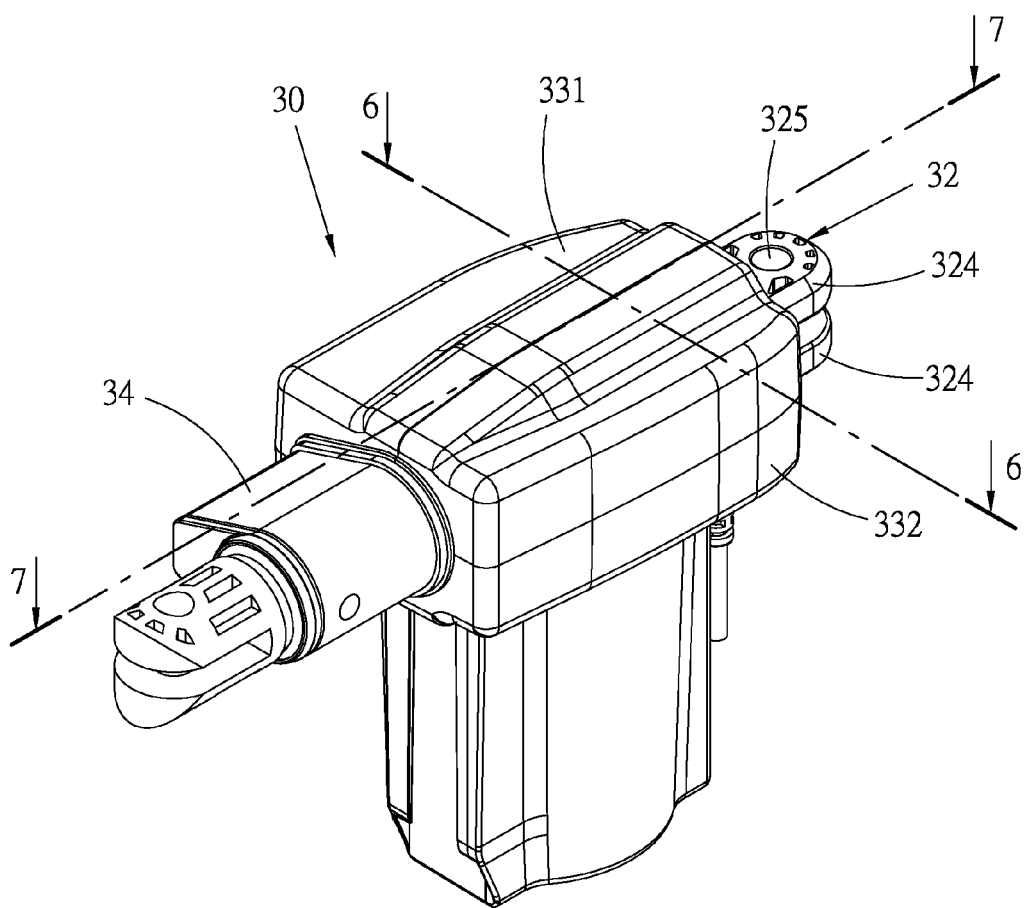
FIG. 4 is a perspective assembled view of a preferred embodiment of the present invention.
Figure 5:
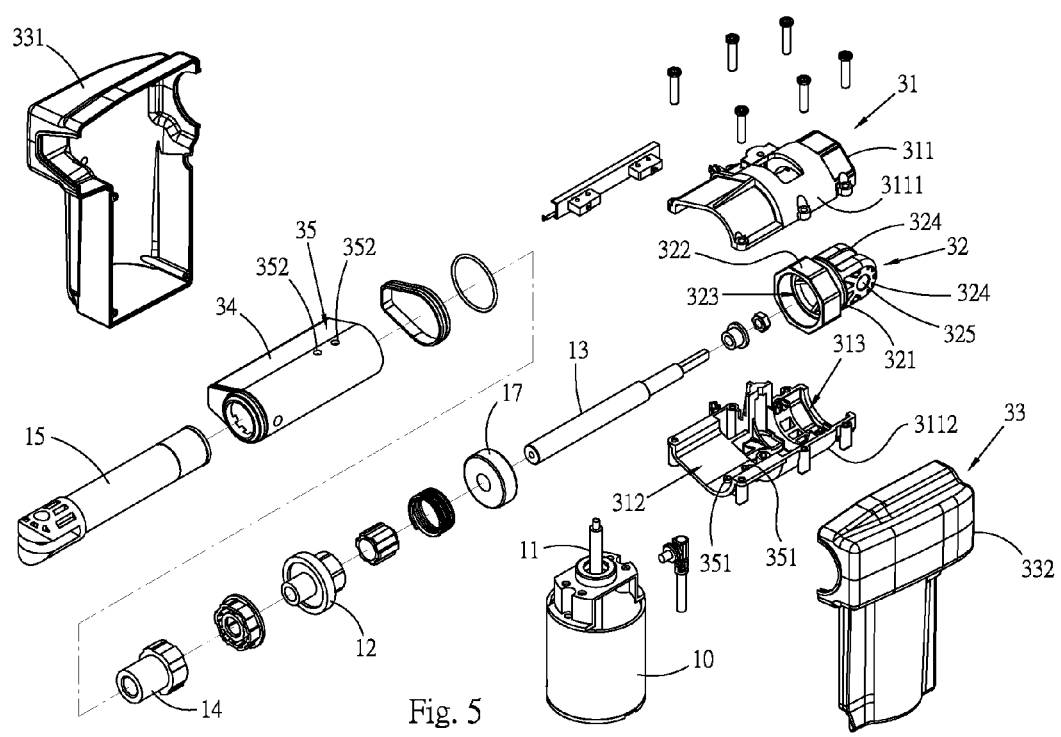
FIG. 5 is a perspective exploded view of the preferred embodiment of the present invention.
Figure 6:
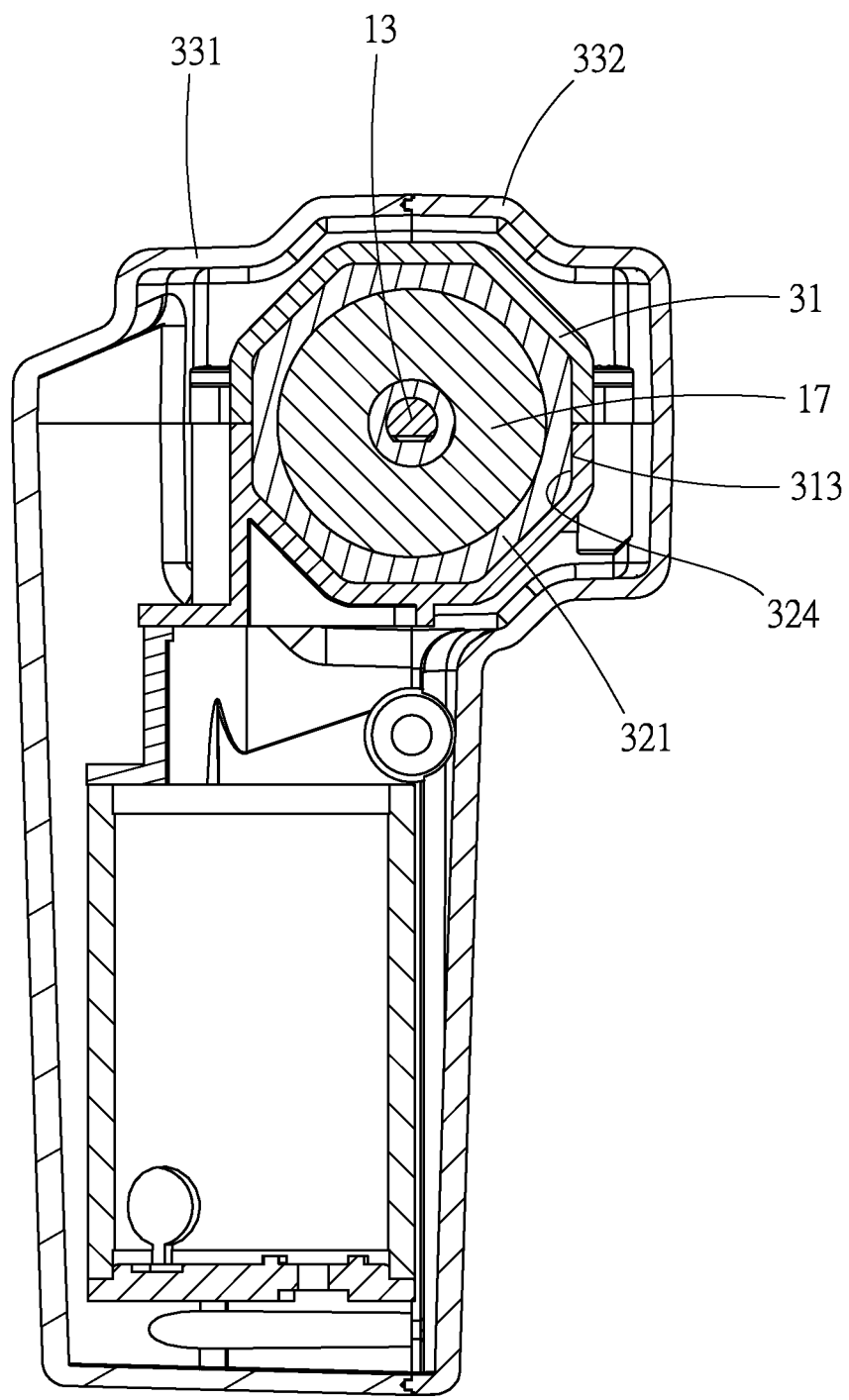
FIG. 6 is a sectional view taken along line 6-6 of FIG. 4.
Figure 7:
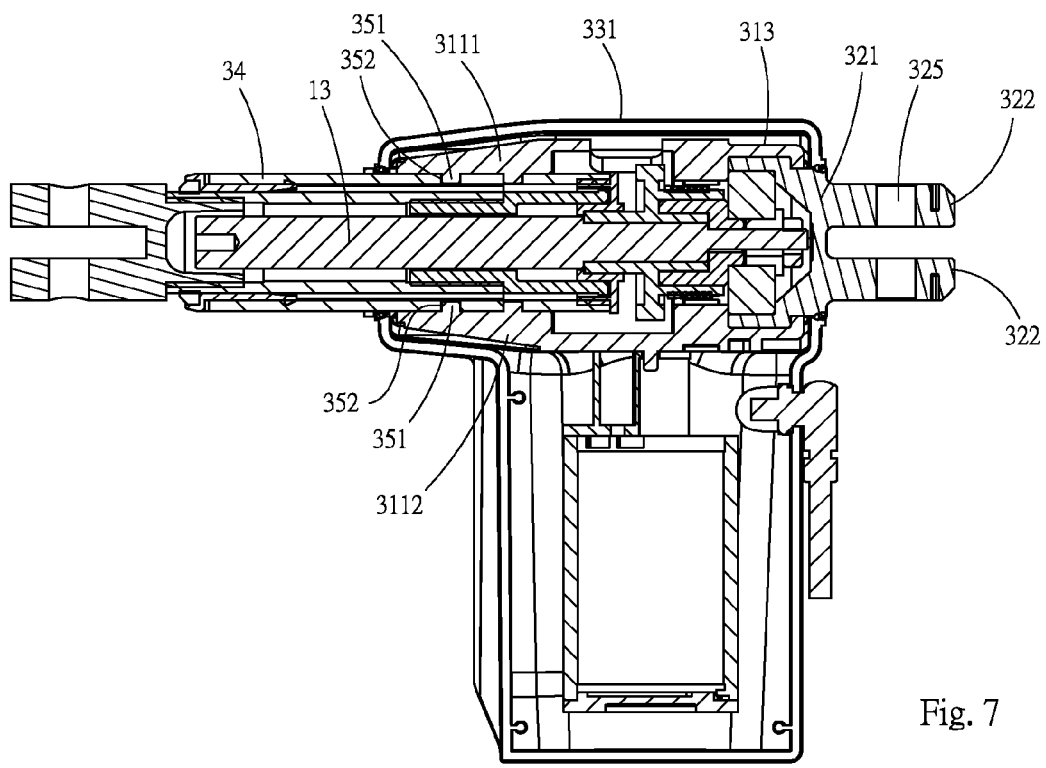
FIG. 7 is a sectional view taken along line 7-7 of FIG. 4.

Please refer to FIGS. 4 to 7. According to a preferred embodiment, the assembling mechanism 30 of the self-locking linear actuator of the present invention includes a gearbox 31, a rear retainer seat 32, a casing 33, an outer tube 34 and an insertion section 35.

The gearbox 31 has a substantially column-shaped box body 311 composed of two half pieces 3111, 3112, which are mated with each other. The mating faces of the two half pieces 3111, 3112 are parallel to an axial direction of the box body 311. An end face of a first axial end of the box body 311 is inward recessed by a certain depth to form a connection room 312. An end face of a second axial end of the box body 311 is inward recessed by a certain depth to form a locating room 313. A peripheral wall of the locating room 313 has a regular octagonal cross-section normal to the axial direction of the box body 311.

The rear retainer seat 32 is an integrally formed one-piece component having a seat body 321. A first end of the seat body 321 is inserted in the locating room 313. The first end of the seat body 321 has a locating peripheral face 322 with regular octagonal shape. The locating peripheral face 322 serves to attach to and contact with the regular octagonal peripheral wall of the locating room 313. An end face of the first end of the seat body 321 is recessed to form a bearing socket 323 in communication with the space of the locating room 313. Two lugs 324 are disposed at a second end of the seat body 321 in parallel to each other. Each lug 324 is formed with a through hole 325 having an axis normal to an extension line of the curvature center of the locating peripheral face 322.

The casing 33 is a hollow body composed of two half casings 331, 332, which are mated with each other to accommodate therein a motor 10 and the box body 31 of the transmission mechanism of the linear actuator. The mating faces of the two half casings 331, 332 are parallel to the axis of the output shaft of the motor 10.

The outer tube 34 pertains to prior art and has a certain length. An axial end of the outer tube 34 is inserted in the connection room 312. The insertion section 35 includes two pairs of cylindrical engaging bosses 351 and two pairs of circular engaging holes 352 complementary to the engaging bosses 351. The engaging bosses 351 perpendicularly oppositely protrude from inner face of a wall of the connection room 312. The engaging holes 352 are recesses formed on outer circumference of the axial end of the outer tube 34. The engaging bosses 351 can be inserted in the engaging holes 352 to fixedly connect the outer tube 34 with the box body 311.

The assembling mechanism 30 of the self-locking linear actuator of the present invention is used to assemble the actuator transmission mechanism as shown in FIG. 1. The assembling process is identical to that of the conventional technique. That is, the gearbox 31 is fixed at one end of the output shaft of the motor 10 to accommodate and locate the perpendicularly engaged worm and worm wheel 11, 12. The threaded rod 13, threaded bush 14 and inner tube 15 are coaxially connected and received in the outer tube 34. One end of the threaded rod 13 extends into the space of the locating room 313 to fit into the bearing 17 inserted in the bearing socket 323. The rear retainer seat 32 is inlaid in one end of the locating room 313 and clamped between the two half pieces 3111, 3112 and located in the locating room 313. The above respective components are housed in the casing 33. According to the above arrangement, in comparison with the conventional assembling mechanism, the assembling mechanism 30 of the self-locking linear actuator of the present invention has the following advantages:

1. In the conventional assembling mechanism, the rear retainer seat is composed of two pieces so that the conventional rear retainer seat is weakened in structure. In contrast, the rear retainer seat 32 of the present invention is an integrally formed one-piece component so that it has better strength for bearing stress. Therefore, the rear retainer seat 32 of the present invention can be more durably used to prolong the lifetime of the linear actuator.
2. The regular octagonal structures of the locating peripheral face 322 and the locating room 313 attach to and contact with each other. Accordingly, the contact state between the locating peripheral face 322 and the locating room 313 can be changed in accordance with the requirement of a user to adjust the angle contained between the axis of the through hole 325 and the axis of the worm 11. Therefore, the rear retainer seat 32 can be installed in a linear actuator by different angle.
3. By means of the insertion section 35, the outer tube 34 of the assembling mechanism 30 can be fixed by means of a smaller number of components than the prior art.
4. The casing 33 is composed of two half casings 331, 332, which are mated with each other in a manner different from the prior art. The mating faces of the two half casings 331, 332 are parallel to, rather than normal to, the axis of the output shaft of the motor 10 as in the conventional assembling mechanism. Due to this structural difference, when the two half casings 331, 332 of the assembling mechanism 30 of the self-locking linear actuator are connected by means of ultrasonic fusion, the assembling mechanism 30 of the self-locking linear actuator can be stably placed on a plane face with the mating faces of the two half casings 331, 332 parallel to the plane face. Accordingly, during the ultrasonic fusion process, the two half casings 23, 24 can keep tightly attaching to each other simply by means of gravity. This ensures the quality of fusion.

The above embodiments are only used to illustrate the present invention, not intended to limit the scope thereof. Many modifications of the above embodiments can be made without departing from the spirit of the present invention.

What is claimed is:

1. A self-locking linear actuator assembling mechanism for assembling and fixing an actuator transmission mechanism, comprising:

a gearbox having a substantially column-shaped box body, the box body being fixedly connected with a motor of a transmission mechanism with an axis of the box body normal to an output shaft of the motor, the box body being composed of two half pieces mated with each other, the mating faces of the two half pieces being parallel to an axial direction of the box body, a connection room axially inward extending from an end face of a first axial end of the box body, a locating room axially inward extending from an end face of a second axial end of the box body by a predetermined depth, a peripheral wall of the locating room having a regular polygonal cross-section normal to the axial direction of the box body;

a rear retainer seat, which is an integrally formed one-piece component, the rear retainer seat having a seat body with a predetermined shape, a first end of the seat body being inserted in the locating room, the first end of the seat body having a locating peripheral face with regular polygonal shape for attaching to and contacting with the regular polygonal peripheral wall of the locating room, the number of the sides of the regular polygonal shape of the locating peripheral face being equal to the number of the sides of the regular polygonal peripheral wall of the locating room, an end face of the first end of the seat body being recessed to form a bearing socket for receiving therein a bearing of a threaded rod of the transmission mechanism;

a casing, which is a hollow body composed of two half casings, which are mated with each other to accommodate therein the transmission mechanism, the gearbox and a part of the rear retainer seat, the mating faces of the two half casings being parallel to an axis of the output shaft of the motor;

an outer tube with a predetermined length, an axial end of the outer tube being inserted in the connection room; and an insertion section including engaging bosses and engaging holes complementary to the engaging bosses, the engaging bosses and the engaging holes being respectively disposed on inner face of a wall of the connection room and the axial end of the outer tube, whereby the engaging bosses can be inserted in the engaging holes to fixedly connect the outer tube with the box body.

2. The self-locking linear actuator assembling mechanism as claimed in claim 1, wherein the peripheral wall of the locating room has a regular octagonal cross-section and the locating peripheral face has a regular octagonal shape.

3. The self-locking linear actuator assembling mechanism as claimed in claim 1, wherein the engaging bosses are cylindrical and protrude from the inner face of the wall of the connection room, while the engaging holes are circular recesses formed on outer circumference of the axial end of the outer tube.

* * * * *